United States Patent
Burnham

(10) Patent No.: US 12,454,936 B2
(45) Date of Patent: Oct. 28, 2025

(54) TURBINE ASSEMBLY

(71) Applicant: HYDRO-FLUX AQUA PRODUCTS LIMITED, Birstall (GB)

(72) Inventor: Doug Burnham, Birstall (GB)

(73) Assignee: HYDRO-FLUX AQUA PRODUCTS LIMITED, Birstall (GB)

( * ) Notice: Subject to any disclaimer, the term of this patent is extended or adjusted under 35 U.S.C. 154(b) by 0 days.

(21) Appl. No.: 19/193,256

(22) Filed: Apr. 29, 2025

(65) Prior Publication Data

US 2025/0257710 A1  Aug. 14, 2025

Related U.S. Application Data

(62) Division of application No. 18/012,679, filed as application No. PCT/GB2021/051648 on Jun. 29, 2021.

(30) Foreign Application Priority Data

Jun. 30, 2020 (GB) ........................ 2010007

(51) Int. Cl.
*F03B 17/06* (2006.01)

(52) U.S. Cl.
CPC ...... *F03B 17/061* (2013.01); *F05B 2210/402* (2013.01); *F05B 2220/32* (2013.01); *F05B 2240/13* (2013.01)

(58) Field of Classification Search
None
See application file for complete search history.

(56) References Cited

U.S. PATENT DOCUMENTS

| | | | | |
|---|---|---|---|---|
| 4,900,227 A | * | 2/1990 | Trouplin | F03D 9/00 416/186 A |
| 2011/0012356 A1 | * | 1/2011 | Burnham | F21S 9/046 290/52 |

* cited by examiner

*Primary Examiner* — Sabbir Hasan
(74) *Attorney, Agent, or Firm* — Jason A. Smith; Shumaker, Loop & Kendrick, LLP

(57) ABSTRACT

A turbine assembly for a generator including a rotor that is operable to rotate about an axis; and a thrust absorbing member, wherein fluid is operable to enter the turbine assembly generally axially with regard to the axis of rotation of the rotor and to exit the turbine generally radially with regard to the axis of rotation of the rotor. The fluid is operable to contact the thrust absorbing member prior to contacting the rotor.

12 Claims, 9 Drawing Sheets

TURBINE ASSEMBLY

FIELD

The present invention relates to a turbine assembly, particularly to a turbine assembly for low flow and/or low pressure systems, for example, for a low flow and/or low pressure generator. Examples of such turbine assemblies may include a turbine assembly for the inlet/outlet of a swimming pool, a micro water course or a water storage system.

BACKGROUND

Renewable energy such as hydro-power whereby the kinetic energy from flowing water can be converted into electrical energy is a vital clean energy source that is in ever greater demand. In such hydro-power systems the kinetic energy of flowing water is used to turn a turbine assembly which converts the energy into rotational energy. A generator assembly can convert the rotational energy of the turbine assembly into electrical energy. There are many turbine designs whereby turbine designs can be matched to particular requirements. In many hydro-power systems, high power is required and therefore the energy conversion of large volumes of fast flowing water is required. However, not every water course, piped water system or water reservoir can deliver high volumes of water at a high head pressure, delivering high electrical outputs. Many smaller water systems can have very low volumes of flowing water at negligible head pressure.

Turbine and generator systems for producing hydro-power from flowing water that has a low flow, due to low volumes of water and/or low head pressures, are often based on high flow designs. Therefore, such turbines are expensive, complicated and inefficient at converting energy in low flow or low pressure systems.

In the turbines of the prior art, for example, a traditional reaction type turbine, such as a Francis turbine, the water flow is opposed by the rotation of the turbine. In such turbines the water flow into the turbine is typically at its perimeter and the spinning action of the turbine causes a centrifugal force on the mass of water within the turbine body. This causes a counter force, opposing the water trying to pass radially inwards before exiting the turbine axially. Due to this effect, such turbines have a threshold where at very low water head pressure and flow, the systems are less efficient and effective. This counterforce negative effect makes the application of small reaction turbine designs generally less suitable for very low head pressure and low flow applications.

It is therefore an object of the aspects of the present invention to address one or more of the above mentioned or other problems and to provide one or more solutions.

SUMMARY

According to a first aspect of the present invention there is provided a turbine assembly for use in a generator comprising a rotor that is operable to rotate about an axis; and a thrust absorbing member, wherein fluid is operable to enter the turbine assembly generally axially with regard to the axis of rotation of the rotor and to exit the turbine assembly generally radially with regard to the axis of rotation of the rotor; and wherein the fluid is operable to contact the thrust absorbing member prior to contacting the rotor. Typically, the rotor is operable to rotate about the thrust absorbing member.

The present invention provides a more flexible and wide spread usage of fluid turbine power generation in very low flow or low pressure systems. Accordingly, the turbine assembly and apparatus of the present invention is suitable to be adopted in fluid circulation systems to recover energy. Previously these systems would not have been considered suitable for use with a turbine for power generation.

The turbine assembly of the present invention may be for very low head pressure.

The turbine assembly of the present invention produces rotational energy from the flow of fluid. The fluid may enter the turbine assembly generally axially with regard to the axis of rotation of the rotor of the turbine assembly. The fluid inflow may be an axial inflow. The fluid exits the turbine assembly generally radially with regard to the axis of rotation of the rotor of the turbine assembly. The fluid outflow may be a radial outflow. The turbine assembly of the present invention may comprise an inlet channel through which fluid is operable to enter the turbine assembly generally axially with regard to the axis of rotation of the rotor. Typically, the axis of the inlet channel is parallel with the axis of the rotation of the rotor and/or the central axis of the thrust absorbing member, more typically, the axis of the inlet channel coincides with the axis of the rotation of the rotor and/or the central axis of the thrust absorbing member. The inlet channel may be a fluid inlet.

The fluid enters the turbine assembly generally axially with regard to the axis of the rotation of the rotor and is diverted to a generally radial flow with regard to the axis of the rotation of the rotor by the thrust absorbing member whereby the fluid may impinge the turbine blades of the rotor to cause a rotational force capable of driving the turbine.

The design of the present invention produces less torque for a given rotor diameter but advantageously is more effective at very low head pressures. Therefore, the turbine may be suitable for low head pressure applications, typically at least 0.5 meter head. The turbine may be suitable for pressure applications of up to 10 meter head pressure, such as up to 7 meter head pressure or up to 5 meter head pressure.

The rotor may be operable to rotate about the thrust absorbing member. The thrust absorbing member and rotor may be coupled. Typically, the rotor may be independently rotatable with respect to the thrust absorbing member.

The thrust absorbing member may be rotationally fixed to the rotor, such that the thrust absorbing member rotation is coupled with the rotation of rotor. Typically, the thrust absorbing member may be rotationally fixed to the rotor however remain independently moveable in the axial direction with respect to the position of the rotor. In other words, the thrust absorbing member may be rotationally coupled to the rotor and axially uncoupled to the rotor.

The rotor is operable to rotate about an axis, typically about its central axis. The rotor may be operable to rotate when fluid flows through the turbine assembly and moves over the rotor.

The rotor may comprise an aperture, typically the rotor may comprise an aperture at the central axis of the rotor about which the rotor rotates.

The rotor of the present invention may be operable to rotate about a shaft, typically the rotor is operable to rotate independently to the shaft. The shaft may be a fixed shaft, such as a shaft that is not able to rotate about the axis of rotation of the rotor.

The thrust absorbing member may be configured to move axially along a fixed shaft relative to the rotor. The thrust absorbing member and a rotational fixed shaft may be configured to move axially relative to the rotor.

The shaft may be operable to move selectively parallel to the rotation axis of the turbine for flow management and/or flow optimisation. The shaft may be operable to move by any suitable movement means, such as a screw mechanism, a spring mechanism or electromagnetic mechanism. The shaft may be operable to move in response to the pressure and/or flow of fluid entering the turbine assembly.

The rotor may comprise a base and a blade or vane extending from the base. The base of the rotor may be generally circular in the cross-section perpendicular to the axis of rotation. Preferably, the base is cylindrical. Suitably, the base of the rotor may be substantially non-porous to the fluid entering the turbine assembly.

The base of the rotor may comprise a depressed central area. Typically, the depressed central area is at least as large as the outer dimension of the thrust absorbing member. More typically, the depressed central area is configured to receive the thrust absorbing member, suitably the bottom portion of the thrust absorbing member.

The depressed area may be configured to receive the bottom portion of the thrust absorbing member, suitably such that a portion of the fluid-contacting face of the thrust absorbing member is generally flush with the fluid-contacting face of the rotor. The fluid-contacting face of the thrust absorbing member may be generally flush with the fluid-contacting face of the rotor around the peripheral edge of the thrust absorbing member. Suitably, the size of the depressed area is such as to allow for a close fit to be formed with the base of the thrust absorbing member whilst typically, allowing the rotor to freely rotate about the shaft and thrust absorbing member. In use, fluid may flow over contacting the fluid-contacting face of the thrust absorbing member and onto the fluid-contacting face of the rotor, typically, without entering the depressed central area of the rotor.

The rotor may further comprise a projection about the central aperture that may protrude into the centre of the thrust absorbing member when the turbine is assembled. The projection may abut the underside face of the thrust absorbing member when the thrust absorbing member is engaged with the rotor. Typically, the thrust absorbing member is engaged with the rotor when the thrust absorbing member sits in the depression of the rotor. Typically, the projection is annular. The projection typically provides bearing support.

The rotor may comprise one or more rotor blades or vanes. The rotor blades or vanes may be configured such that fluid exiting the rotor is directed tangentially to the direction of rotation, thus typically, the exit of fluid out of the rotor gives additional propulsion to the rotor and combined with the centrifugal forces acting on the fluid moving radially outward allows for lower impedance to the fluid exiting the rotor's periphery. Preferably, the rotor blades or vanes are curved in a direction that is substantially perpendicular to the axis of rotation of the rotor. The rotor blades or vanes may form a spiral structure from the central axis to the outer edge of the rotor. The geometry of the rotor blades or vanes may be optimised to maximise their efficiency in energy transfer.

The rotor blades or vanes may extend from the rotor base. Suitably, the blades or vanes extend upwardly from the rotor base. The height of the rotor blades or vanes may be optimised depending on the maximum flow through required of the turbine assembly.

The rotor blades or vanes and the rotor base may be integrally formed, suitably from a plastic, cast metals or alloy material, more typically, plastic.

The rotor may further comprise a capping member or shroud.

The fluid-contacting surface of the rotor and blades or vanes may form fluid channels in which fluid travels as it passes over the rotor. The fluid-contacting surface of the base of the rotor may form the base of the fluid channels. The rotor blades or vanes may form the side walls of the fluid channels. The capping member may form the ceiling of the fluid channels. The fluid channels may comprise an entrance aperture proximal to a fluid inlet to the rotor, suitably adjacent to the thrust absorbing member, and an exit aperture proximal to the periphery of the rotor, through which the fluid is operable to pass into and out of the fluid channels. As such, the fluid channels may be substantially closed along the channel except for an entrance aperture proximal to the fluid inlet and an exit aperture proximal to the periphery of the rotor.

The capping member, rotor, and/or blades or vanes may be reversibly attachable to form a turbine assembly. The capping member may be reversibly attachable to the rotor via the blades or vanes. The capping member, rotor and/or blades or vanes may each comprise an attachment means, such as male and/or female attachment member. Typically, the top face of the blades or vanes may comprise at least one attachment means, typically a male attachment member, and the capping member may comprise at least one corresponding attachment means, typically a female attachment member. More typically, the blades or vanes may extend from the rotor base and may comprise at least three male attachment members of differing size on the top surface, which are reversibly attachable to a series of at least three female attachment members of the capping member. The female attachment members of the capping member are distributed to secure the rotor base and blades and vanes securely in position when engaged with the male attachment members of the rotor.

The capping member may be secured by any suitable fixing means, for example, sonic weld, glue or screw.

It has been found that the capping member advantageously reduces the turbulent flow of the fluid. Thus, a more efficient turbine is produced from improved efficiency in the fluid flow.

The rotor blades or vanes may have a form whereby the fluid contacting surface which is exposed to the force of the fluid that enters the rotor (a fluid loading edge surface) has a larger radius compared to the alternate fluid contacting surface prescribed by the lesser radius. In other words, the rotor may be configured so that the fluid contacting surface of the blades or vanes creates an area of high pressure on the loading edge surface and an area of low pressure on the opposite side to the loading edge surface thereby assisting rotational forces in the driven direction (for example, like aircraft wing section generating lift).

The thrust absorbing member according to the present invention may be operable to be coupled to the shaft. Typically, the thrust absorbing member may be fixedly attached to the shaft. More typically, the thrust absorbing member may be operable to be coupled to a fixed shaft. Most typically, the thrust absorbing member may be fixedly attached to the fixed shaft.

The thrust absorbing member may be fixedly attached to a housing unit of the turbine assembly.

The thrust absorbing member may have a convex bell-shaped outer face. The thrust absorbing member may have a shape which is defined by the largest radius to transition from axial flow to radial flow that can practically be achieved, thereby resulting in a system with the lowest power loss.

The thrust absorbing member may be configured to deflect the fluid from an incoming axial flow toward an outwardly radial flow. The flow of the deflected fluid may then be obstructed by the rotor blades or vanes of the rotor creating a turning force on the rotor. In other words, the flow of the deflected fluid may then strike the rotor blades or vanes imparting kinetic energy from radial flow into the rotor resulting in rotation of the rotor.

The thrust absorbing member absorbs excessive axial thrust forces caused by fluid as it enters the turbine assembly. The thrust absorbing member thereby reduces frictional losses on the axial thrust bearing. The thrust absorbing member may be fixed to either a shaft and/or to housing of the turbine, such as to a front portion of the turbine housing relative to the inflow of fluid.

The thrust absorbing member may have fixed or adjustable blades or vanes components to optimize the radial angle of the fluid exiting the thrust absorbing member.

The fluid directing blades or vanes of the thrust absorbing member may be moved or selectively fixed at an angle to optimise the angle of the fluid flow entering the rotor. The fluid directing blades or vanes may be moved or selectively fixed at an angle to optimise the angle that the fluid flow strikes the blades of the rotor. For example, this may include optimising the speed, torque or head performance of the turbine assembly.

The fluid directing blades or vanes of the thrust absorbing member may have variable blade geometry. The variable geometry of the blades or vanes may be adjusted by an adjustment member mechanism such as mechanical or electrical/magnetic actuators or centrifugal mechanisms either local or remotely.

These adjustment members may be hydraulic, or pressure mechanisms devices that are functional to monitor or respond to fluid flow characteristics, such as flow quantity metering devices or pressure sensors could be designed to communicate and control actuators communicating with adjustable blades on the thrust absorbing member.

The fluid directing blades or vanes of the thrust absorbing member may be part of a separate fluid directing member. Such a fluid directing member may comprise fixed or adjustable blades or vanes components to optimize the angle of the fluid exiting the fluid directing member, across the thrust absorbing member, into the rotor of the turbine assemble.

The fluid directing blades or vanes may be configured such that fluid exiting the thrust absorbing member is directed tangentially to the orientation of rotor blades or vanes adjacent to the thrust absorbing member, typically, perpendicular. Thus, typically the exit of fluid out of the thrust absorbing member into the rotor gives propulsion to the rotor. Preferably, the fluid directing blades or vanes of the thrust absorbing member are curved. The fluid directing blades or vanes may form a spiral structure from the central surface of the thrust absorbing member to the outer edge of the thrust absorbing member, adjacent to the rotor.

The fluid directing blades or vanes of the thrust absorbing member may be curved oppositely to the curvature of the rotor blades or vanes. In other words, if rotor blades or vanes spiral clockwise, the fluid directing blades may spiral counter-clockwise, and vice versa.

The thrust absorbing member may comprise an adjustable or fixed fluid directing blades or vanes. The blades or vanes may be adjustable about the radial plane.

The blades or vanes may be adjustable in the axial direction, suitably such as to allow for the size of the fluid entrance and/or exit aperture of the rotor to be changed, such as increased or decreased. Accordingly, axial movement of a corresponding blade or vane could be utilised to regulate the fluid exiting the thrust absorbing member just before entering the rotor at its entry aperture. This feature could typically comprise a thrust absorbing member that is moveable in the axial direct by telescopic means, and in operation would have a first position whereby fluid is restricted from passing the thrust absorbing member into the rotor and a second position whereby the flow of fluid into the rotor is less restricted by the thrust absorbing member. Suitably the thrust absorbing member may be operable to substantially prevent passage of fluid into the rotor and/or be operable to offer no restriction to the passage of fluid in the rotor entrance aperture. Suitably, the axial movement of the blades or vanes of the thrust absorbing member i.e. the 'blade or vane depth' may be altered to affect the fluid flow exiting the thrust absorbing assembly into the rotor.

A thrust absorbing member that is moveable in the axial direct by telescopic means may be adjustable by the means described herein, such as an adjustable spring loaded screw thread or electromagnets.

The turbine assembly may comprise an axially variable thrust absorbing member that is biased into the first position, typically by a means of a spring, thereby fully closing the rotor from the fluid flow. The thrust absorbing member may be moved into the second position by the fluid flow which creates a force onto the thrust absorbing member, pushing it against the biasing member to progressively allow fluid to pass the thrust absorbing member and enter the rotor.

It has been found that for a fixed rotor vane geometry the flow optimisation of the turbine assembly by reducing or increasing the flow into the rotor by this telescopic movement is very important when optimising the performance for a specific fluid flow or pressure of the turbine assembly, or corresponding generator.

In one example, the turbine assembly may have a diameter of about 80 mm and corresponding vane depth of about 3.3 mm. In one example, the turbine assembly is suitable to operate with a flow between 1,000 l/hour and 12,000 l/hour. The optimum performance of the turbine assembly may be adjusted to suit any flow rate between 1,000-12,000 l/hour by adjusting the position the axial position of the thrust absorbing member with respect to the entry port and thereby adjusting fluid intake of the apparatus.

The turbine assembly may be connected via a drive shaft arrangement. The turbine assembly may further comprise magnets, typically the rotor may comprise at least one magnet. The magnets may be inductively coupled with adjacent stator coils. In one example, the turbine assembly may have integrated inductive coupling whereby magnets are integrated into the turbine body and are capable of being operationally associated with stator stationary coils fixed into an adjacent stator housing. Typically, the adjacent stator coil and/or stator housing forms part of the turbine housing. In one example, the rotor may comprise magnets within its base or adjacent, to magnetically/inductively communicate with fixed stator coils in the housing of the turbine assembly.

In other words, the generator assembly may comprise a static portion, upon which may be situated one or more stator coils. The stator coils may be arranged on the static portion to correspond with the position of the one or more magnets on the rotor.

In one example, the turbine may have magnets embedded in the turbine body. The magnets may form a surface of the exposed turbine or rotor base, opposite the fluid facing face. The magnets may be cylindrical in shape and may be orientated parallel to the axis of rotation.

Relative movement between the magnets of the turbine and the stator coils causes electricity to be generated. The turbine assembly may be configured as part of a generator assembly. The turbine assembly may be configured as part of a generator assembly operable with very low head pressure, for example, at a swimming pool inlet or outlet as a swimming pool inlet or outlet generator. In one example where the turbine assembly of the present invention is configured to absorb a portion of the kinetic energy contained within a fluid flow system, for example fluid circulation system such as a pool water fluid circulation system, there is little or no increased back pressure or reduction of flow of the system realised. In fact, the increase in pressure and reduction in flow caused by the presence of a turbine assembly of the present invention on a fluid flow system, such as a swimming pool, would match the loses of a typical return eyeball fitting which would be replaced when fitting the turbine assembly.

The static portion may further comprise one or more electronic components associated with the turbine assembly, such components include: batteries; battery control units; generator control units; master control units, RF communication transmission or receiver devices or other forms of communication, for example laser or sonic based devices.

Preferably, the static portion is generally "water tight". Such water tightness may be achieved by rubber seals etc. The at least one electrically powered device may be fitted to the static portion of the turbine assembly.

The thrust absorbing member may be moveable in the axial direction with respect to the rotation of the rotor. In other words, the thrust absorbing member may be axially variable. In one example, the axially variable thrust absorbing member may form part of a regulating arrangement to optimise and regulate how much of the fluid flow from turbine inlet enters the rotor of the turbine assembly. Accordingly, the thrust absorbing member may be moved axially to restrict the fluid exiting the thrust absorbing member and therefore restrict the fluid from entering the rotor of the turbine assembly. This may result in effectively closing the rotor of the turbine assembly to the flow of fluid.

In other words, there may be an aperture between the thrust absorbing member and the rotor through which, in use, fluid may flow. The aperture may increase or decrease in size and regulate the flow of fluid into the rotor, typically, when the aperture is bigger in size, flow of fluid into the rotor may increase compared to when the aperture is smaller in size and the flow of fluid into the rotor may decrease. The turbine assembly may comprise a flow regulating member that may obstruct the aperture. The flow regulating member may be moveable to increase or decrease the degree of obstruction. When the flow regulating member obstructs the aperture, the aperture is effectively reduced in size. When the flow regulating member does not obstruct the aperture, the aperture effectively increases in size compared to when it is obstructed. Therefore, the flow regulating member may act to optionally obstruct flow of fluid from the thrust absorbing member into the rotor. The flow regulating member when obstructing flow of fluid from the thrust absorbing member into the rotor may result in an increase of pressure about the thrust absorbing member and a decrease of pressure about the rotor. It is understood that when the flow regulating member reduces its obstruction of the aperture, the pressure about the thrust absorbing member may decrease and the pressure about the rotor may increase. The skilled person understand that the fluid flow and pressure of the fluid are related and therefore the term flow regulating member may be synonymous with the term pressure regulating member. There may be a turbine assembly comprising a flow regulating member and/or pressure regulating member, typically the flow regulating member and/or pressure regulating member is an axially variable thrust absorbing member, that is capable of regulating flow of fluid into the rotor of the turbine assembly.

Fluid entering the rotor may be controlled by reducing the outlet of the thrust absorbing member and thereby reducing the inlet of the rotor by axially moving the thrust absorbing member and rotor axially towards the fluid inlet.

The thrust absorbing member may be fixedly attached to the shaft and move axially with the axial movement of the shaft. The thrust absorbing member may be moveable in the axial direction independently of the shaft. For example, the thrust absorbing member may be telescopically attached to the shaft so that the axial length of the thrust absorbing member and shaft may be optionally increased or decreased, thereby reducing or increasing the flow path through the rotor of the turbine assembly. The thrust absorbing member may be rotationally fixed with the rotor and axially moveably, for example, the thrust absorbing member may be telescopic, thereby moving the thrust absorbing member along the axial axis which can increase or reduce the thrust absorbing member exhaust aperture.

The thrust absorbing member may be attached to the shaft by a spring member. The thrust absorbing member is biased such that it extends into the turbine assembly inlet, reducing the flow into the rotor of the turbine assembly. In use, if fluid flow is too low to generate power, the pressure of the fluid is too low and the spring is not compressed and therefore the thrust absorbing member extends into the inlet, blocking fluid from exiting the thrust absorbing member and entering the rotor. As the pressure increases, the fluid applies a force onto the thrust absorbing member in the direction of the fluid inlet, i.e. along the axial axis, and compresses the spring, moving thrust absorbing member into an open position where the fluid can freely flow into the rotor of the turbine assembly. In other words, the axially variable thrust absorbing member may regulate flow that is too low for use by blocking the rotor from the inlet flow of fluid at low pressures.

The axially variable thrust absorbing member may regulate flow that is too high for the device by blocking the rotor from the inlet flow of fluid at high pressures.

Advantageously, a turbine assembly that regulates the flow entering the turbine assembly surprisingly reduces the axial forces that the rotor and axial bearing are exposed to in use.

The thrust absorbing member may be optionally axially moveable with respect to the shaft, however remain rotational fixed to the shaft so that when the shaft is rotated, the thrust absorbing member is also rotated. In one example, this allows the thrust absorbing member to be optimally aligned to the flow of the system both rotationally and axially. The movement of the thrust absorbing member may be manual or automated, typically, the movement is self-regulated, for example, by using a biasing means.

According to a second aspect of the present invention there is an apparatus for use in a generator comprising:

a. a turbine assembly comprising a rotor that is operable to rotate about an axis;
b. a turbine assembly inlet channel;
c. a turbine assembly bypass channel; and
d. a pressure regulating member wherein fluid is operable to enter the turbine assembly from the inlet channel generally axially with regard to the axis of rotation of the rotor and to exit the turbine generally radially with regard to the axis of rotation of the rotor;

wherein the inlet channel is operable to be in fluid communication with the bypass channel through a bypass aperture, wherein the pressure regulating member is operable to be moved from a first position to a second position, wherein in the second position the pressure regulating member restricts fluid flow through the bypass aperture to a greater extent than in the first position, and wherein fluid that enters the bypass channel is diverted from entering the turbine assembly through the inlet channel.

Therefore, the present invention provides an improved entry port assembly that reduces the axial thrust that is a negative consequence of the fluid entering the turbine assembly axially. This axial thrust can be very significant but on small turbines can be mitigated by a pressure regulating member and bypass channel as disclosed above, in other words, by using a bypass arrangement.

Accordingly, the apparatus of the present invention may comprise a bypass arrangement. The bypass arrangement is operable to divert or regulate flow into or away from turbine assembly, and therefore is operable to increase or reduce the head fluid pressure or flow into the turbine as required.

Typically, the pressure regulating member may be manually adjustable to regulate the head fluid pressure. The pressure regulating member may be automatically regulated, for example, depending on the pressure of the fluid entering the turbine assembly. The pressure regulating member comprises coil spring thruster.

In one example, the pressure regulating member may be moveable from a first closed position to a second open position, wherein the first closed position the bypass channel is closed to the fluid in the inlet and the second open position the bypass channel is open to the fluid in the inlet and allows fluid to enter the bypass channel and be diverted from the turbine assembly.

Typically, the pressure regulating member is a sleeve, more typically an annular sleeve, that forms the wall of the inlet channel which delivers fluid to the turbine assembly. The pressure regulating member is typically a sleeve, more typically an annular sleeve, that is positioned on top of a biasing means and offset from the walls of the inlet channel. The pressure regulating member may be adjacent to the periphery of the inlet channel and allows the abundant of fluid to flow and enter the turbine assemble. The pressure regulating member is formed of an annular shoulder that protrudes into the inlets channel. As fluid enters the turbine assembly through the inlet, the water strikes the top (inlet side) of the pressure regulating member and acts against the shoulders applying a force to the biasing means. In use, as the pressure increases in the inlet channel, the force applied to the pressure regulating member also increases and can move the pressure regulating member from the biased position.

The apparatus may comprise an adjustable outlet which provides a route for fluid to bypass the turbine when desired. Typically, the pressure regulating member comprises a sleeve with an aperture and wherein the sleeve is moveable so that the aperture may align with a corresponding entry point aperture in the bypass channel such that when in an open configuration the apertures are aligned and fluid may flow into the bypass channel and when in a closed configuration the apertures are not aligned and flow is reduced, suitably, flow can be stopped completely if the apertures do not overlap. Typically, the pressure regulating member is biased into the first position, and as pressure increases, the pressure regulating member is moved to a second position wherein the bypass channel is exposed and the pressure of the inlet channel is reduced.

In one example, the pressure regulating member is a spring-loaded valve aperture assembly. A Spring-loaded valve aperture assembly may have seals (for example. 'O' ring seals) to facilitate a more complete sealing. As the head pressure increases the aperture bypass port surfaces are pushed apart against the pressure of a spring (typically a coil spring) into a second open configuration and thereby provide a bypass route for the fluid entering the turbine assembly. Upon opening of a bypass route, the aperture bypass port surfaces can return to their original first position if the pressure is decreased.

The turbine assembly may comprise magnets that may be in a counter thrust arrangement between the rotor body and the magnetic like poles surfaces which are configured to create a push between firstly the rotor body and secondly against the fixed body or stator housing. This arrangement could be configured to mitigate a portion of unwanted axial thrust, thus reducing energy losses. Magnetic counter thrusters could also be adopted to mitigate unwanted axial thrust from the magnetic attraction between the magnets positioned to function with the stator coils integral with the rotor body having an attractive force with iron containing within the stator coil assembly that is required to enhance the magnetic circuit of the generator.

The thrust absorbing member described herein is capable to transfer most, if not all, of the axial thrust force produced by the incoming fluid flow that would normally strike the turbine rotor directly. These forces represent kinetic energy from the incoming fluid flow. The thrust absorbing member may also redirect the axial thrust force to radial flow thereby minimising the loss of energy and increasing the efficiency of the turbine assembly or generator comprising the thrust absorbing member.

The thrust absorbing member of the present invention surprisingly provides a solution for protecting the thrust bearing of the turbine assembly from excessive wear and energy loss. The thrust absorbing member described herein advantageously is simple to produce and use. Further, the simple design provides a cost effective solution to the problem of the present application. Furthermore, the simple design also provides a thrust absorbing member that is reliable and durable, remaining effective over long periods of time.

At least some of the axial force of the fluid may be absorbed by the thrust absorbing member to thereby reduce the axial force applied to the rotor by the fluid that would otherwise be applied to the rotor in the absence of the thrust absorbing member. Suitably, the force absorbed by the thrust absorbing member is transferred to the shaft. This allows the rotor to rotate about the central axis without being subjected to excessive axial loading.

In the turbine assembly of the present invention fluid may move over the rotor generally radially with regard to the axis of rotation of the rotor. This fluid 'flow through' format, wherein the fluid moves over the rotor generally radially with regard to the axis of rotation of the rotor, creates a turbine with a lower resistance to fluid flowing through the turbine and there is no counter force to oppose flow through the turbine assembly.

The turbine assembly and/or apparatus of the present invention may be suitable to facilitate power generation in remote locations where no grid power is available and flowing water (hydropower) could be utilised. The power generated by a generator comprising the turbine assembly and/or apparatus disclosed herein may be suitable to charge mobile phones, provide lighting, typically LED lighting, or monitoring the environment with the function of remote monitoring communication technologies this could be utilized to relay information. Information may be transmitted through radio frequency, laser, sonic, microwave, or mobile phone communication technology.

Heads of water could be utilised by storage of water as a result on tidal replenishing of tanks, then directing the tanks water to turbine assembly to generator power. Storage tanks could be replenished due to rain fall or small water course flows.

It can be appreciated that fluid circulation systems in industrial process could be adapted to use the present invention. Typical usage, for example in swimming pool re-circulation filter systems/fountains. Usage would typically be in areas that have no power grid facilitates and other potential renewable power system are not practical, for example, no wind or solar could be adopted. Also, usage that required no electrical hook-up to equipment to be power for safety reasons or bad locations, whereby running cables is impractical or not cost effective, even if grid power is available.

Advantageously, a bypass arrangement can reduce the axial force on the thrust bearing. A bypass arrangement in combination with the thrust absorbing member of the present invention has surprisingly been found to produce a more efficient turbine assembly that has optimised fluid flow parameters allowing efficient generation of rotational energy even at very low fluid pressure and/or flows, and also effective at high fluid pressure and/or flow.

The turbine assembly of the present invention is operable by the input of any fluid, typically, water.

All of the features contained herein may be combined with any of the above examples and in any combination.

For a better understanding of the invention, and to show how embodiments of the same may be carried into effect, reference will now be made, by way of example, to the following figures.

BRIEF DESCRIPTION OF DRAWINGS

FIG. 4b shows a side view of the turbine assembly of FIG. 4a.

FIG. 13 shows a cross-sectional side view of a non flush pool inlet light.

FIG. 14 shows a cross-sectional side view of a flush pool inlet light.

DETAILED DESCRIPTION

Figure 1:
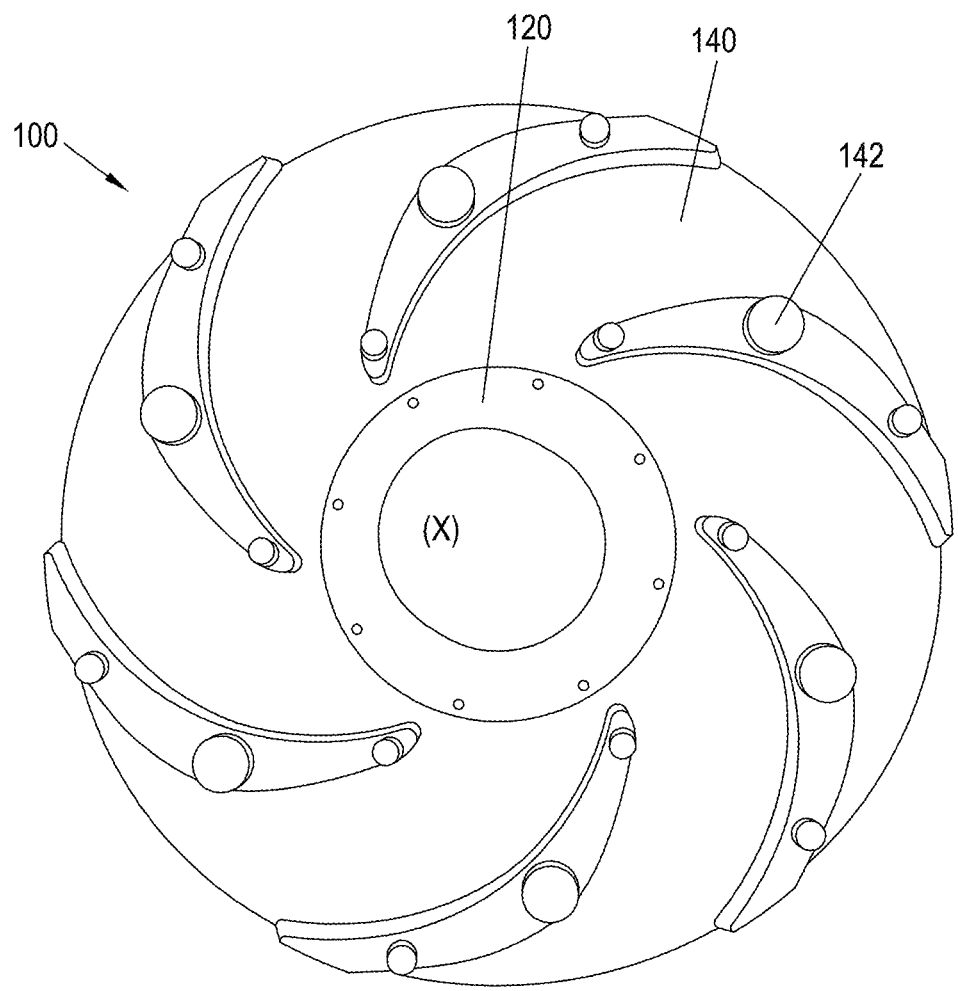
FIG. 1 shows a top view of a partially assembled turbine assembly of the present invention.

Referring first to FIG. 1, there is shown a turbine assembly 100 of the present invention. Turbine assembly 100 is formed of rotor 140 and thrust absorbing member 120.

Rotor 140 is circular in shape, forming a disk. Rotor 140 is operable to rotate about a central axis. Rotor 140 has aperture 122 at its centre. FIG. 1 views turbine down the central axis which is marked with (X).

Thrust absorbing member 120 has a circular lower edge that has a diameter smaller than the diameter of rotor 140.

Thrust absorbing member 120 is positioned on the at the centre of the top surface of rotor 140, on the central axis. Rotor 140 extends laterally beyond thrust absorbing member 120 and an outer ring of rotor 140 is exposed, on which blades 142 are positioned. Rotor 140 contains six blades 142.

Rotor 140 is formed of a rotor base 141 and blades 142 that extend from rotor base 141. Blades 142 are raised section of rotor 140. Blades 142 are positioned from inner edge of exposed rotor 140, adjacent to thrust absorbing member 120, and are orientated in a spiral manner towards the outer edge. The orientation of the spiral blades 142 dictate whether the rotor will rotate clockwise or counter clockwise about its central axis in use. Rotor 140 in FIG. 1 is shown with blades 142 that are orientated so that they spiral outwards in a clockwise manner, and therefore, will induce a counter clockwise rotation of the rotor in use.

Figure 2:
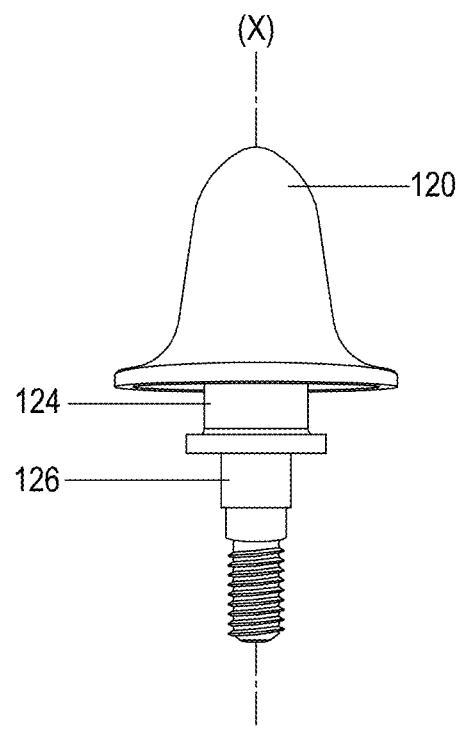
FIG. 2 shows a side view of the thrust absorbing member of FIG. 1.

Thrust absorbing member 120 of FIG. 1 is shown from a side view in FIG. 2. Thrust absorbing member 120 has a circular cross section and forms a rounded cone like shape. The apex of thrust absorbing member 120 is centred on the central axis of rotor 140 in use. The lower edge of thrust absorbing member 120 is flared outwardly at the edges. Thrust absorbing member 120 is fixedly attached to shaft 126. Fixed shaft 126 is positioned along the central axis of thrust absorbing member 120. Thrust absorbing member 120 is partially hollow and shaft 126 is fixed at one end at the centre of the inside portion of thrust absorbing member 120.

The outside portion of thrust absorbing member 120 is the surface that contacts the fluid in use. The shape of the outside portion of the thrust absorbing member 120 is a convex bell shape as seen in FIG. 2.

Shaft 126 extends below thrust absorbing member 120 and through bearing 124. In turbine assembly 100, thrust absorbing member 120 is independently coupled to rotor 140 by shaft 126 that goes through the aperture of rotor 122, thereby through the central axis of rotor 140, labelled (X).

Aperture 122 of rotor 140 is configured to accept bearing 124, allowing free rotation about shaft 126 that is connected to thrust absorbing member 120. The upper face of rotor 140 is depressed in the centre where the thrust absorbing member is positioned in turbine assembly 100. The depression is circular and is only slightly larger than the periphery of the lower edge of thrust absorbing member 120 so that the thrust absorbing member 120 forms a close fit within the depression. This factor, combined with the depth of the depression and the height of the base of the lower edge of the thrust absorbing member results in the outer face of the flared base of thruster absorbing member 120 being generally flush with the outer face of rotor 140 when assembled as seen in FIG. 1.

Thrust bearing 125 facilitates the rotation of rotor 140 about shaft 126. In use fluid enters the turbine assembly and passes over thrust absorbing member 120 which absorbs the force from the fluid flow and minimises its distribution so that little to no axial force is transferred to thrust bearing 125.

In one example (not shown) thrust absorbing member 120 is raised slightly in the axial direction relative to rotor 140 to enhance flow of fluid between thrust absorbing member and rotor.

Figure 4A:
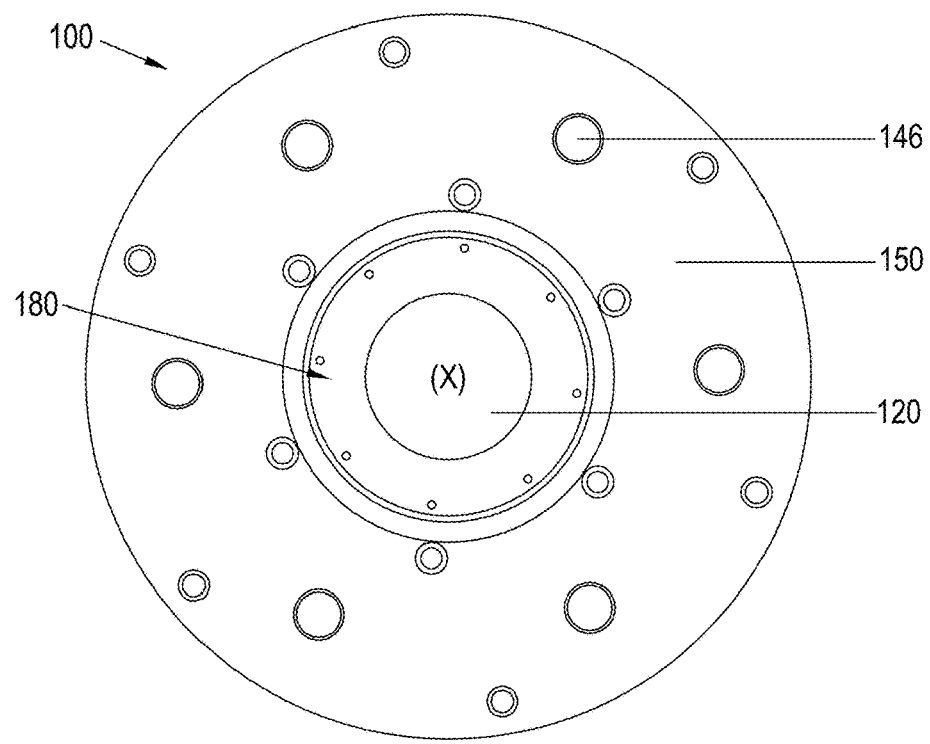
FIG. 4a shows a top view of the turbine assembly of FIG. 1 in a further assembled configuration.
Figure 4B:
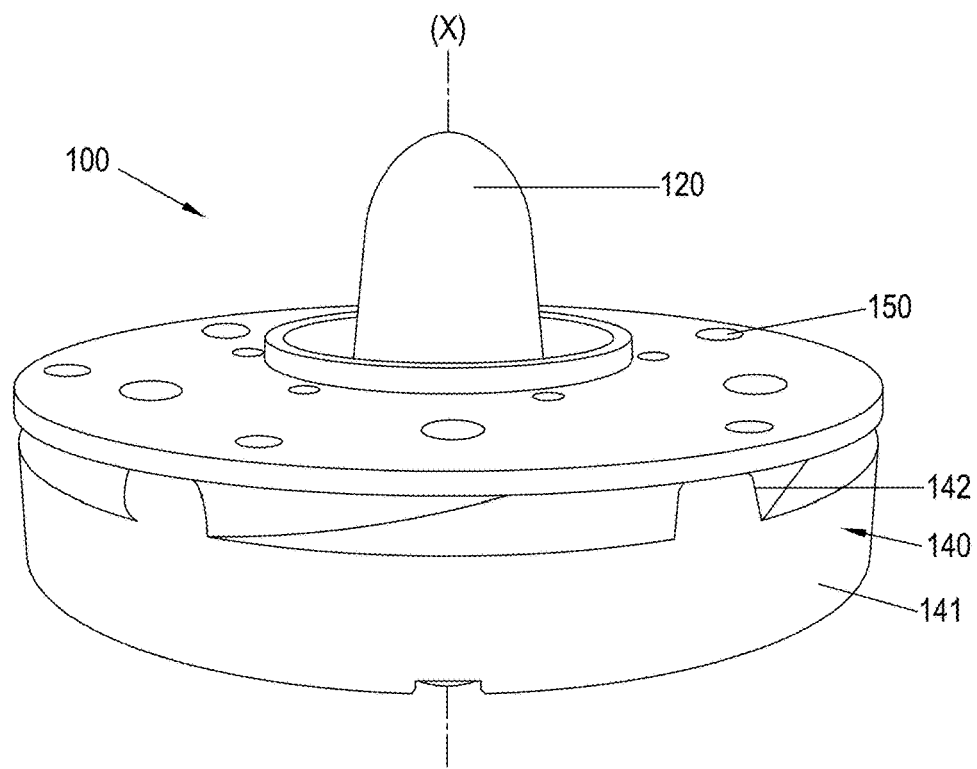

Rotor 140 also contains connecting members 146 that are formed as part of blades 142. Connecting members 146 are raised nodules on the top surface of blades 146 that reversibly attach rotor base 141 with a capping member 150. Turbine assembly 100 is shown with rotor 140 and capping member 150 in FIGS. 4a and 4b.

Figure 3:
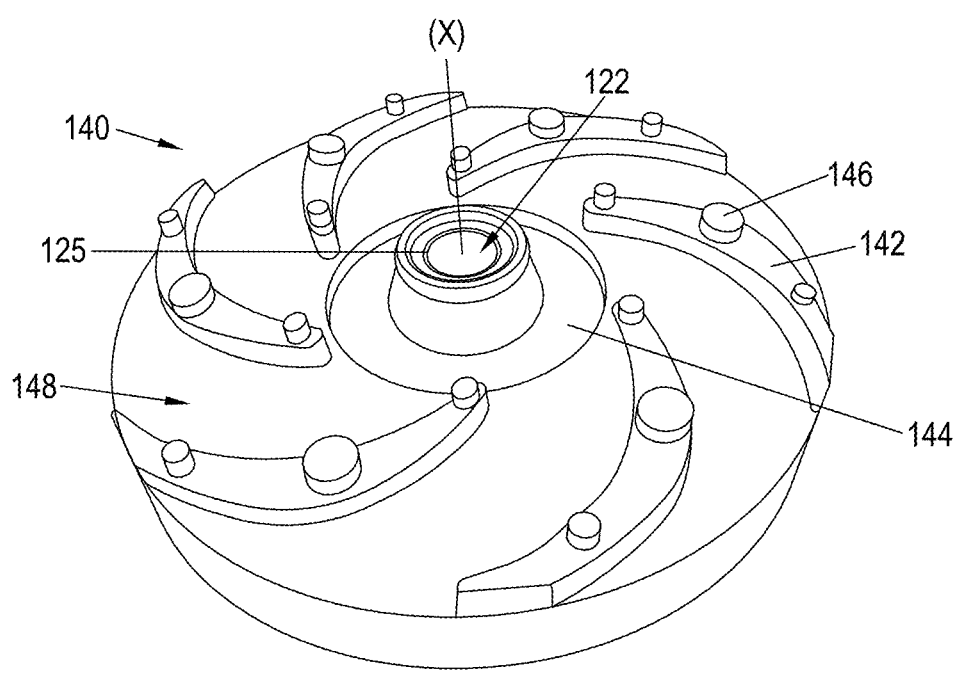
FIG. 3 shows a side perspective view of the rotor of FIG. 1.

Capping member 150 and rotor base 141 is concentric and coterminal. Accordingly, capping member 150 is circular disk that has the same diameter as rotor 140. Capping member 150 provides a ceiling for forming flow channels in turbine assembly 100. Flow channels 148 are delineated at the bottom by fluid contacting surface of rotor 140, the sides by blades 142 and the top by capping member 150. Flow channels 148 are thereby between adjacent blades 142 of rotor 140. As shown in FIG. 3, the turbine assembly has six blades and therefore six flow channels. Flow channels 148 have an inner opening, where fluid enters, which is adjacent to thrust absorbing member 120, and an outer opening, where fluid exits, which is at the outer edge of rotor 140 (seen in FIG. 4b).

Capping member 150 contains a large central aperture, which is the same diameter as the maximum diameter of thrust absorbing member 120. When assembled, the central apex of thrust absorbing member 120 extends through the central aperture of capping member 150. The gap between the central aperture of capping member 150 and thrust absorbing member 120 forms fluid entry point 180 of turbine assembly 100, this is the axial inflow of the turbine assembly.

Capping member 150 contains multiple smaller apertures that are complementary in size and position to connecting members 146. Connecting members 146 couple with apertures in capping member 150 to connect rotor 140 with capping member 150, thereby forming channels 148. Alternatively, capping member 150 and rotor 140 may be fixedly attached (not shown).

Fluid directing blades 162 optimise the angle of the fluid as it passes over thrust absorbing member 120, thereby further directing fluid entering flow channels 148 from thrust absorbing member 120. Fluid directing blades 162 spiral from the central surface of thrust absorbing member 120 to its outer edge in a different pattern to the blades 142 of rotor 140. Accordingly, if rotor blades 142 of rotor 140 spiral clockwise, fluid directing blades will spiral counter-clockwise, and vice versa. Fluid directing blades 162 are curved blades that have outer edges that are complementary in shape to the outer face of thrust absorbing member 120. This allows for fluid directing blades 162 to be flush to thrust absorbing member 120.

Fluid directing blades 162 optimise the fluid over the thrust absorbing member so that on entry to rotor 140 the fluid strikes blades 142 perpendicularly, thereby producing a highly efficient turbine assembly. Further, this arrangement results in thrust absorbing member 120 advantageously absorbing further force axial thrust from the incoming fluid in turbine assembly 100.

Figure 5:
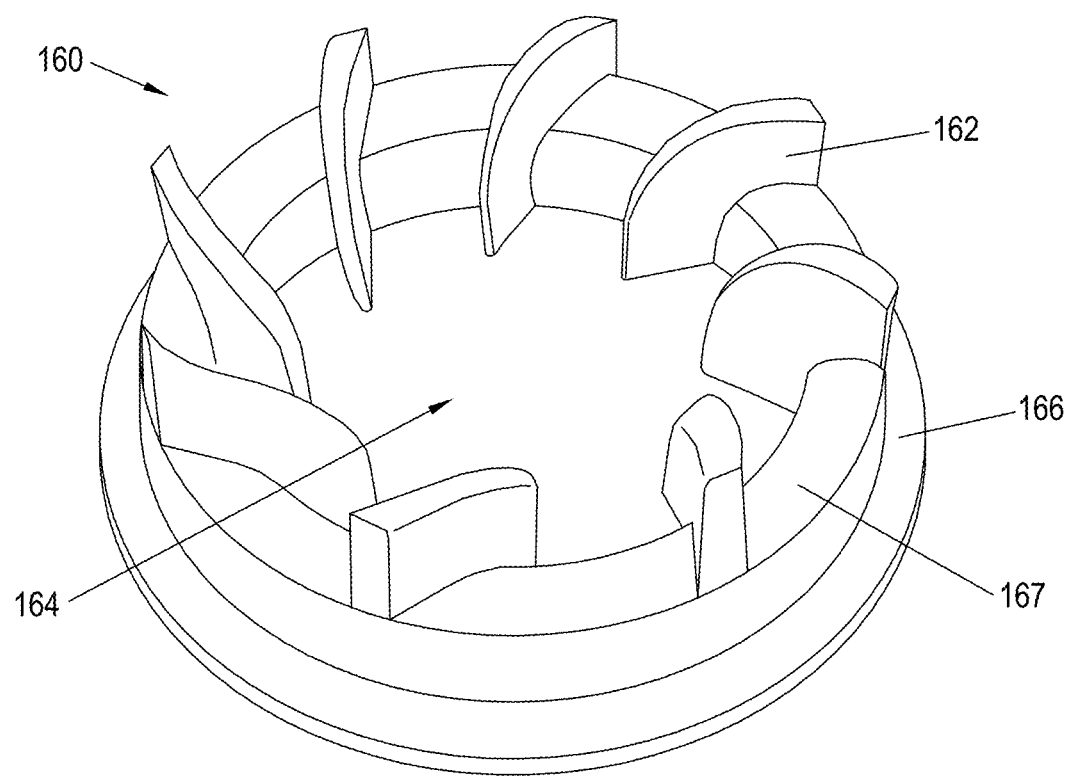
FIG. 5 shows a side perspective view of a guide member.

Fluid directing blades 162 may be fixedly attached to thrust absorbing member 120 (not shown). Fluid directing blades 162 are fixedly attached to ring 166 to form fluid directing member 160, as shown in FIG. 5.

Ring 166 of fluid directing member 160 is formed about central aperture 164. Ring 166 is formed of main inner ring 167, which is expanded at the top to form outer ring 168. The diameter of inner ring 167 is the same, or slightly smaller, than thrust absorbing member 120, and therefore central aperture of capping member 150. When assembled, inner ring 167 engages the complementary central aperture of capping member 150; outside ring 168 is larger than the central aperture and secures fluid directing member 160; and fluid directing blades 162 are flush with the surface of thrust absorbing member 120.

Figure 6:
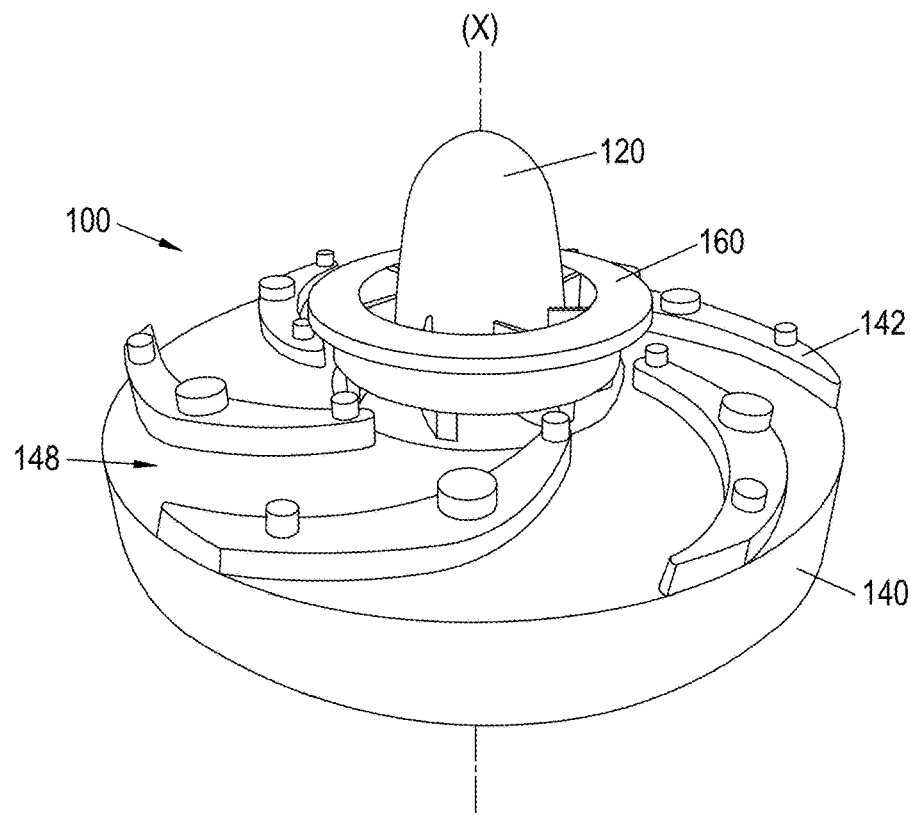
FIG. 6 shows a side perspective view of the turbine assembly of FIG. 1 with the guide member of FIG. 5.

Turbine assembly 100 is shown in FIG. 6 formed of rotor 140, thrust absorbing member 120 and fluid directing member 160 so that the orientation of fluid directing blades 162 and blades 142 of rotor 140 is visible.

In use, fluid enters turbine assembly 100 along the central axis (X) of rotor 140, about which it rotates, and hits thrust absorbing member 120. Some of the axial force of the input fluid is absorbed, and the fluid is deflected by thrust absorbing member 120 to move generally radially with regard to the axis of rotation of rotor 140, over rotor 140 and into blades 142, turning rotor 140.

Figure 7:
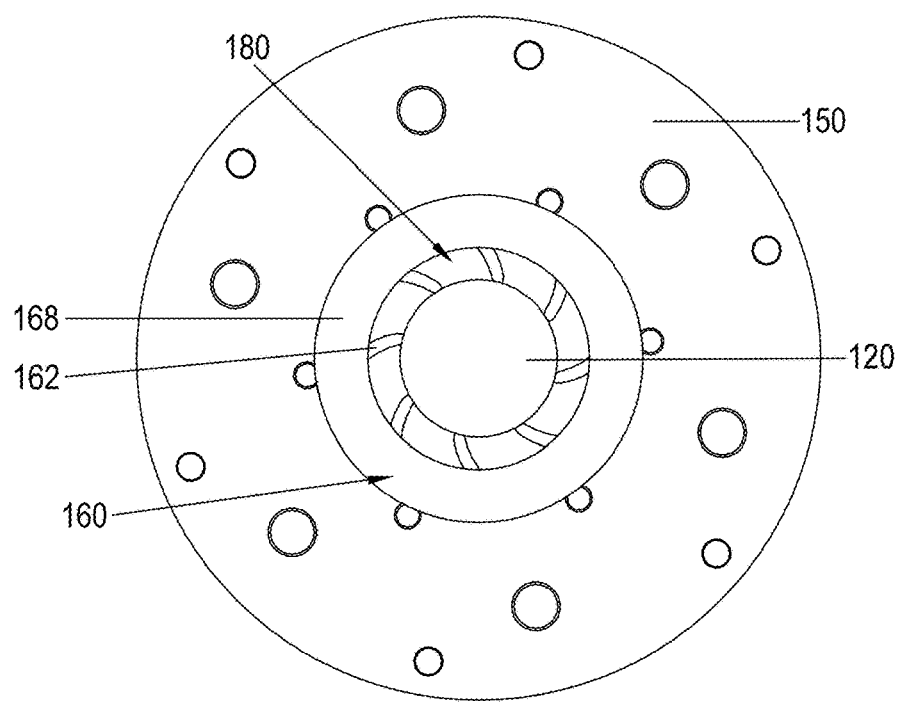
FIG. 7 shows a top view of the turbine assembly of FIG. 4a with the guide member of FIG. 5.
Figure 8:
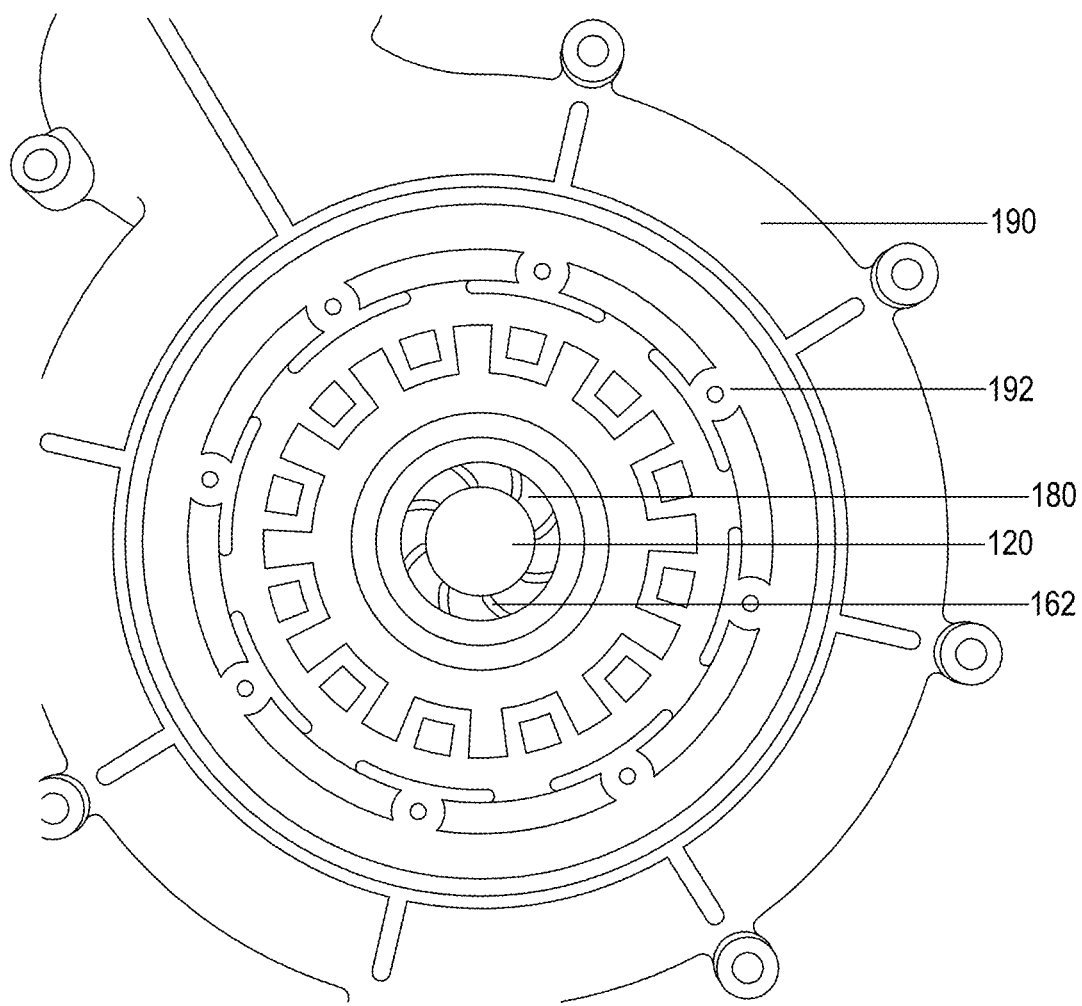
FIG. 8 shows a top view of the turbine assembly of FIG. 7 within a turbine housing.

FIG. 7 shows a top view of turbine assembly 100 formed of rotor (not shown), thrust absorbing member 120, capping member 150 and fluid directing member 160. From the top view apertures can be seen that are formed by outer ring 168 and fluid directing blades 162 of fluid directing member 160, and thrust absorbing member 120. These apertures are fluid entry points 180 of turbine assembly 100.

Turbine assembly 100 may be fixed to turbine housing 190. Turbine housing 190 is a complementary casing that attaches to turbine assembly 100 and allows rotor 140 to rotate in use. Turbine housing 190 provides an interface for a fluid pipe that can be attached at attachment points 192, which are positioned in a circle around turbine assembly 100 for use with a pipe with a circular cross section, thereby sealing turbine assembly 100 at the end of a fluid inlet pipe, for example, a water inlet pipe. Thrust absorbing member 120 is positioned at the centre of attachment points 192, and fluid entry points 180 allows fluid to enter turbine assembly 100 from a fluid inlet pipe (not shown) that is attached to turbine housing 190.

Figure 9:
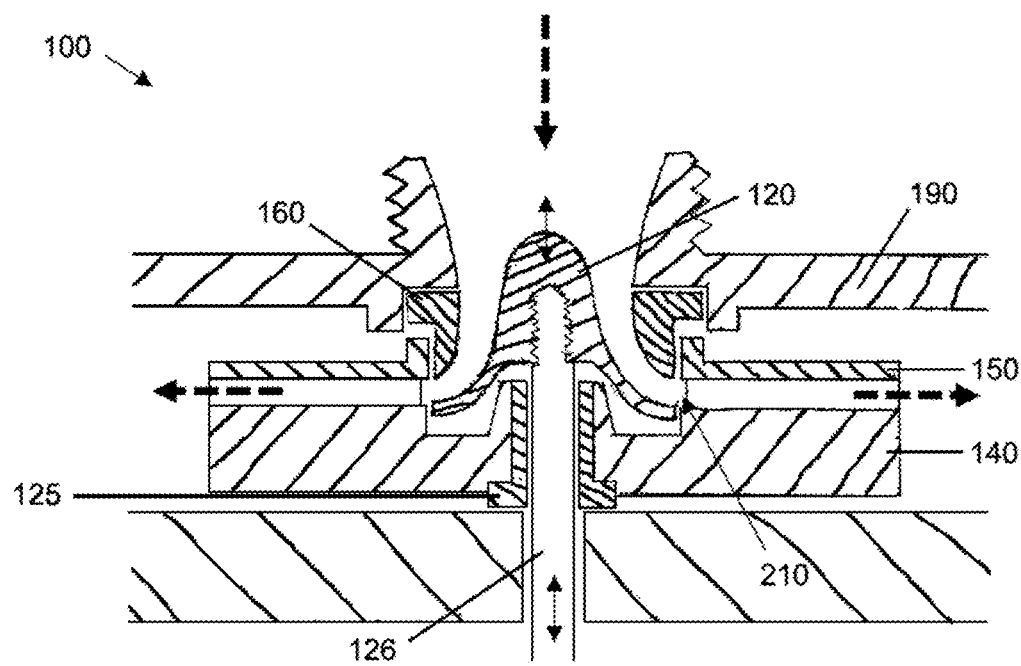
FIG. 9 shows a cross-sectional side view of a turbine assembly according to the present invention.

FIG. 9 shows a cross-sectional side view of turbine assembly 100 formed of rotor 140, capping member 150, thrust absorbing member 120, shaft 126 and fluid directing member 160. The side view of turbine assembly 100 has the shaft aligned vertically, along the axial axis, with the fluid inlet arranged at the top of the turbine assembly. The fluid flow through turbine assembly 100 is indicated by the dashed arrows. Fluid enters the turbine assembly inlet and passes over thrust absorbing member 120 and enters rotor 140 via the junction 210 which is the border between rotor 140 and thrust absorbing member 120. Junction 210 represents the thrust absorbing member 120 fluid outlet and the rotor 140 fluid inlet. Fluid then passes through rotor 140 and exits turbine assembly 100.

Thrust absorbing member 120 is fixedly attached to shaft 126 which is moveable in the axial direction as indicated by the double headed arrows in FIG. 9. Rotor 140 is free to rotate on shaft 126. In other words. thrust absorbing member 120 and shaft 126 are fixed together and can be moved axially by moving shaft 126 to alter the size of junction 210 between thrust absorbing member 120 and rotor 140. In one example, shaft 126 is only moveably in an axial direction.

Thrust absorbing member 120 is shown in a first open configuration in FIG. 9 when thrust absorbing member 120 is flush with rotor 140 allowing fluid to flow out of the thrust absorbing member outlet and into the rotor inlet at junction 210.

In use, when shaft 126 is moved towards the fluid inlet, the exit aperture from thrust absorbing member 120 can be moved from an open configuration to a closed configuration.

Figure 10:
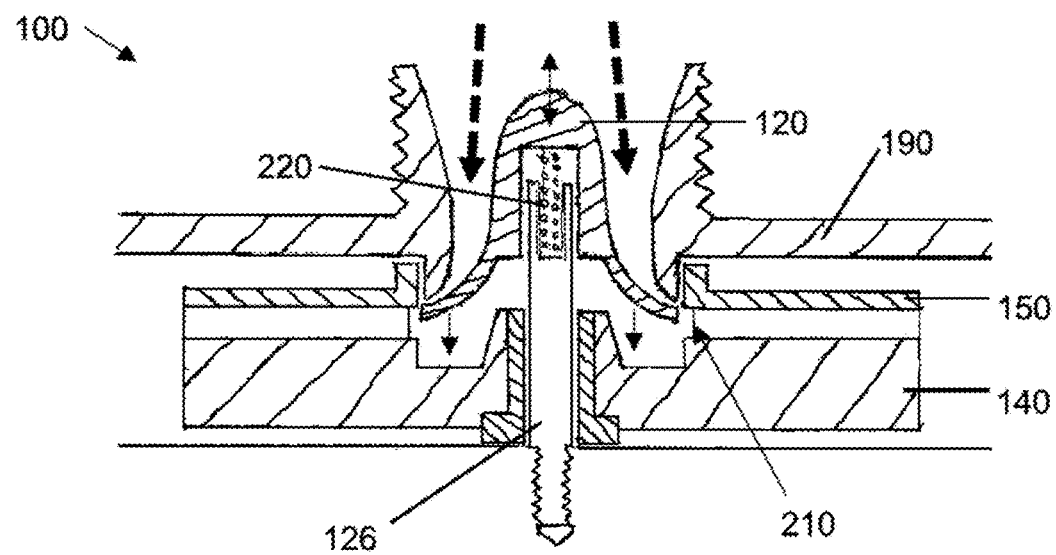
FIG. 10 shows a side cross-sectional side view of a turbine assembly according to the present invention.

Thrust absorbing member 120 may be moveable axially independently of shaft 126 as shown in FIG. 10. FIG. 10 shows a cross-sectional side view of turbine assembly 100 as described in FIG. 9, however, thrust absorbing member 120 is fixed to shaft 126 by biasing means 220. In the embodiment shown in FIG. 10, shaft 126 is fixed with rotor 140 free to rotate about shaft 126 and thrust absorbing member 120 is rotationally fixed to shaft 126 but can move in an axial direction on shaft 126, for example, against a biasing means 220. In other words, thrust absorbing member 120 can move axially independent of shaft 126. Thrust absorbing member 120 can be extended or retracted along coinciding axes of shaft 126 by a telescopic action.

In FIG. 9, an axially movable shaft is connected to a thrust absorbing member to regulate flow into the rotor. An alternative arrangement could be adopted whereby torque from the rotor could be transferred to an alternative generator assembly (not shown), such as an alternative generator assembly that is not integral to the rotor or adjacent housing. The axially moveable shaft connected to the thrust absorbing member may then pass through the drive shaft centre. Thus, the drive shaft would rotate around an axially moveable shaft. The two shafts could alternatively rotate together.

In a further embodiment of the assembly of FIG. 9, a sealed cavity could be present beneath the thrust absorbing member 120, such as by providing seals between the thrust absorbing member 120 and rotor 140. Fluid may be operable to enter and exit the sealed cavity, such as via the shaft 126, such as to allow for hydraulic movement of the thrust absorbing member. Such a configuration may allow for improved control of the movement of the thrust absorbing member.

Turbine assembly 100 in FIG. 10 is shown in a second closed configuration wherein thrust absorbing member 120 is extended into the turbine inlet and prevents fluid from entering rotor 140.

In the closed configuration, the outer edges of thrust absorbing member 120 are adjacent to the fluid directing member 160 and turbine housing 190 such that fluid is prevented from entering rotor 140.

Thrust absorbing member 120 in FIG. 10 is extended and elongated along the axial axes of turbine assembly 100 against biasing means 220. In one example, biasing means 220 is a compression spring. As fluid enters turbine assembly 100, it creates a force upon thrust absorbing member 100 which is transferred to shaft 126 via biasing means 220. As the pressure in the fluid inlet increased biasing means 126 may be compressed by the force of the fluid and this force acts on biasing means 220 causing compression. Therefore, as the pressure increases, biasing means 220 compresses and results in thrust absorbing member 120 retracting onto shaft 126, thereby aligning the outlet of thrust absorbing member 120 with the inlet into rotor 140 at junction 210 resulting in the turbine assembly changing to a first open configuration where fluid can enter rotor 140.

In use, the flow of the fluid entering turbine assembly 100 applies force onto thrust absorbing member 120 which moves due to compression of biasing means 220, thereby increasing the outlet of the thrust absorbing member (i.e. increasing its exit aperture) from a closed to an open configuration. It is also understood that depending on the flow rate, the force applied to the turbine assembly may result in the biasing means being partially compressed and therefore, the fluid exiting thrust absorbing member 120 and entering rotor 140 via junction 220 is partially restricted. In other words, the amount of fluid entering rotor 140 is self-regulated by turbine assembly 100.

FIG. 10 shows an arrangement whereby the thrust absorbing member 120 progressively moves towards the rotor 140 in response to an increased inlet flow pressure. This arrangement may additionally allow for a check on flow direction, meaning that if a suction flow is applied to the rotor assembly inlet port, the fluid flow would enter on the periphery of the rotor. As such the flow would enter the rotor radially inwards and then exit axially under a negative pressure. The thrust absorbing member under this reverse flow condition (for example if the device is connected inappropriately to a suction port on a circulation system) would 'check' the flow closing the water passages between the thrust absorbing member and rotor at 210.

Figure 11:
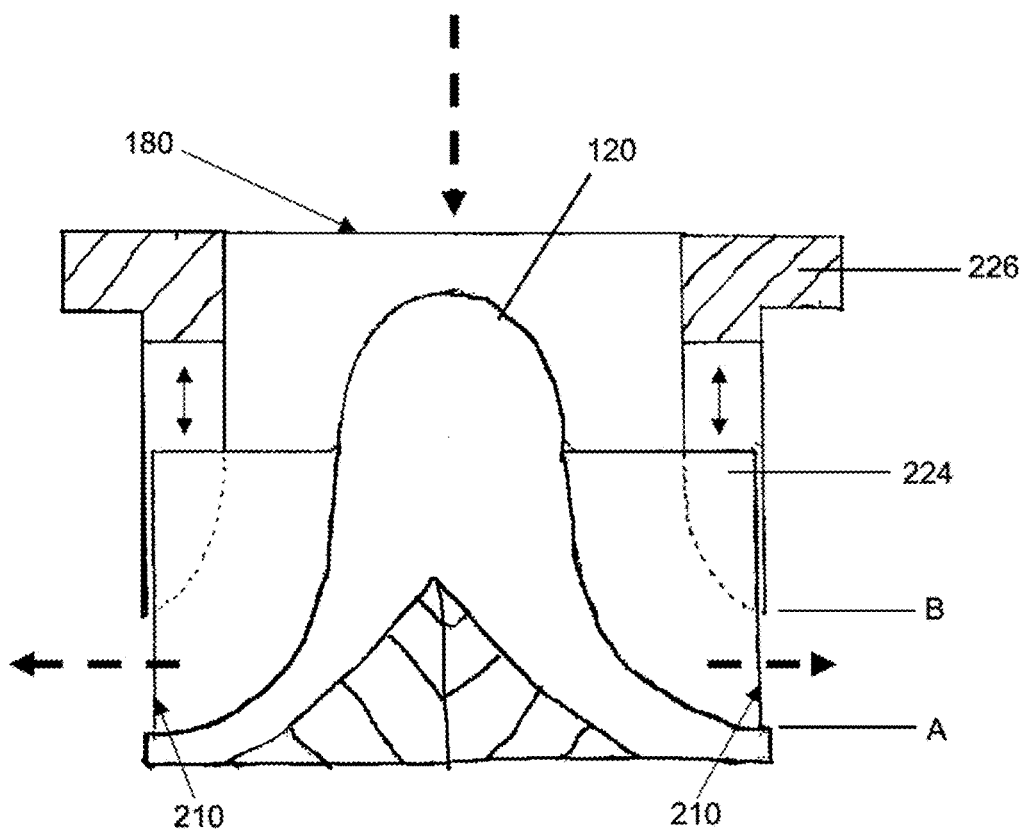
FIG. 11 shows expanded cross-sectional side view of a thrust absorbing member of a turbine assembly according to the present invention.

FIG. 11 shows a cross-sectional expanded side view of turbine assembly 100. The fluid flow through is indicated by the dashed arrows. Thrust absorbing member 120 comprises integral guide vanes 224 which can be considered as male components. In use, thrust absorbing member 120 is operable to move upwards towards the fluid entry point 180 and associated guide ring 226, and retract, as indicated by the double headed arrows. In other words, FIG. 11 shows a telescopic guide vane assembly.

When thrust absorbing member 120 is aligned with letter A as shown in FIG. 11, the junction 210 is open so that fluid flow between thrust absorbing member 120 and rotor (not shown). As thrust absorbing member 120 moves to a closed configuration (i.e. towards point B) the aperture between thrust absorbing member 120 and rotor (not shown) is closed so that junction 210 no longer connects thrust absorbing member 120 and rotor (not shown).

Guide ring 226 contains slots to accept guide vanes 224 of thrust absorbing member 120 as thrust absorbing member 120 moves from A towards B. In other words, associated guide ring 226 is female and accepts thrust absorbing member guide vanes 224 in a telescopic action (male-female). In one example, guide ring 226 may be part of the housing 190 as shown in FIG. 10.

Figure 12:
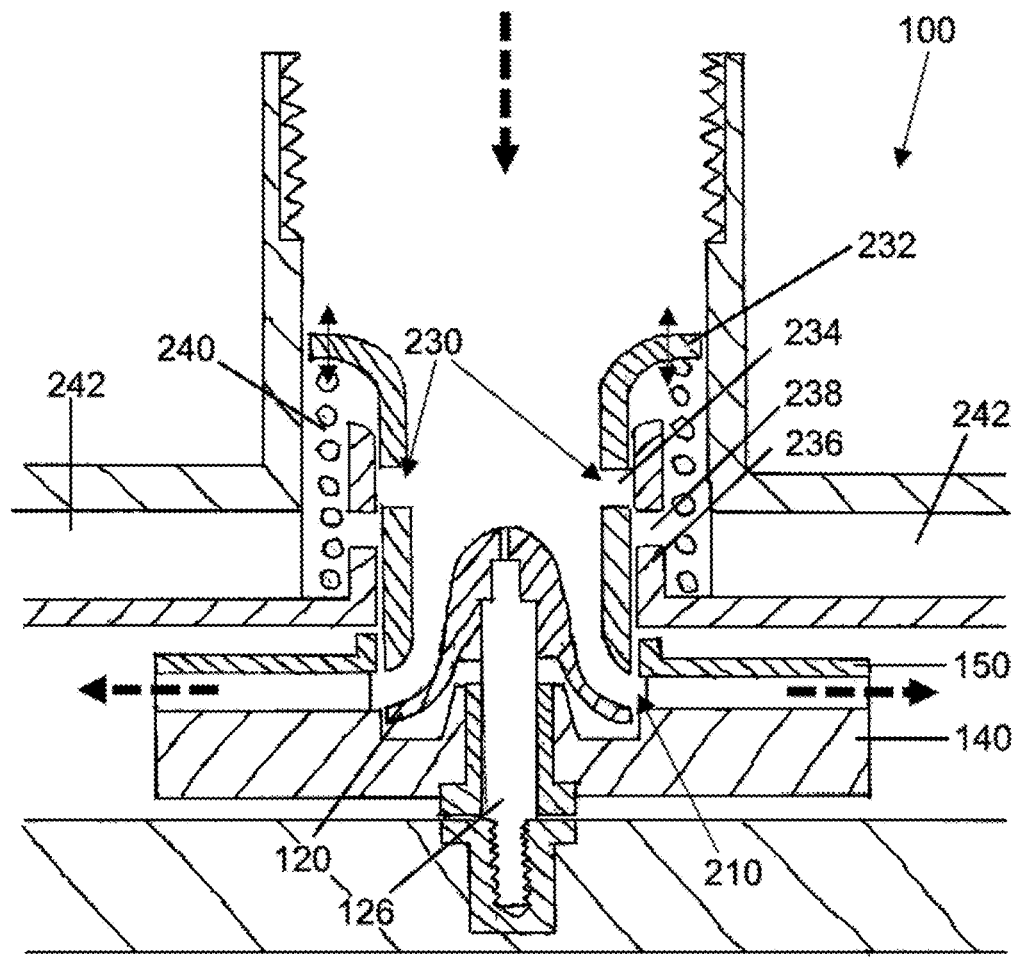
FIG. 12 shows a cross-sectional side view of a turbine assembly according to the present invention.

FIG. 12 shows a cross-sectional side view of an alternative embodiment according to the present invention in which turbine assembly 100 is formed of thrust absorbing member 120, shaft 126, rotor 140 and capping member 150. Thrust absorbing member 120 is fixedly attached to shaft 126, with rotor 140 and capping member 150 free to rotate about shaft 126. Bypass arrangement 230 is positioned between thrust absorbing member 120 and inlet and provides an adjustable inlet to bypass fluid channel 242.

Bypass arrangement 230 is formed of inner sleeve 232, outer sleeve 236 and biasing means 240. Inner sleeve 232 contains inner aperture 234 and outer sleeve 236 contains outer aperture 238. Inner sleeve 232 is operable to move axially with respect to turbine assembly 100. Biasing means 240 biases bypass arrangement 230 into a closed configuration wherein inner aperture 234 and outer aperture 238 are not aligned and fluid cannot enter bypass fluid channel 242. In an open configuration the inner aperture 234 and outer aperture 238 are aligned. In use, the force of fluid entering turbine assembly 100 applies force onto outer sleeve 232 which if high enough, results in compressing biasing means 240 and moving inner sleeve 232 with respect to outer sleeve 236 and aligning or at least partially aligning inner aperture 234 and outer aperture 238 providing the fluid entering turbine assembly 100 flow through the bypass arrangement 230 into bypass fluid channels 242.

Inner sleeve 232 also acts to control the fluid exiting thrust absorbing member 120 and entering rotor 140 via junction 210. In bypass arrangement 230, when moving from an open to closed configuration, inner sleeve 232 moves in the axial direction providing the means to align or block the outer aperture 238 to bypass fluid channel 242. Additionally, inner sleeve 232 also acts to control junction 210 and can move axially so that junction 210 is in an open configuration and unobstructed, to a closed configuration when junction 210 is obstructed by inner sleeve 232 preventing fluid from entering rotor 140.

Inner sleeve 232 is positioned such that when biasing means 240 is expanded and bypass arrangement 230 is in a closed configuration, junction 210 is in an open configuration and fluid entering turbine assembly 100 is diverted by thrust absorbing member 120 and enters rotor 140 via open junction 120 (as shown in FIG. 12). When biasing means 240 is compressed, inner sleeve 232 is positioned such that bypass arrangement 230 is in an open configuration with inner aperture 234 and outer aperture 238 aligned, and inner sleeve 232 is blocking junction 210 and fluid entering turbine assembly 100 is prevented from entering rotor 140 due to closed junction 210 and is diverted to bypass fluid channel 242 by the open bypass arrangement 230 (not shown).

Biasing means 240 of bypass arrangement 230 is a piston device. In use, bypass arrangement 230 provides regulation means whereby movement of biasing means 240 piston due to excess flow moves the piston from an expanded state as shown in FIG. 12 (with the thrust absorbing member exit aperture fully open) to a compressed state (not shown) were the thrust absorbing member exit aperture closes and at the same time proportionally opening the bypass gate. When movement against spring pressure of biasing means 240 occurs the exit aperture is closed when the bypass arrangement fully open. This results in preventing excess flow and pressure from striking the rotor and provides a self-regulating method of the rotor speed.

A bypass arrangement may be positioned between turbine housing 190 and fluid inlet pipe (not shown) via attachment points 192 as shown in FIG. 9, to further regulate the fluid entering the turbine assembly, and therefore further optimise the efficiency of turbine assembly 100.

FIG. 13 shows an embodiment according to the present invention of a non-flush pool inlet light which is formed of thrust absorbing member 120, shaft 126, rotor 140 and capping member 150. Magnets 260 are fixedly attached to rotor 140 and are operable to generate power from the rotation energy of rotor 140. LED Light 262 is operable to be powered by the electricity generated by the rotation of rotor 140 and magnets 260.

FIG. 14 shows an embodiment according to the present invention of a flush fitting pool inlet light which is formed of thrust absorbing member 120, shaft 126, rotor 140 and capping member 150. Magnets 260 are fixedly attached to rotor 140 and are operable to generate power from the rotational energy of rotor 140. LED light 262 is operable to be powered by the electricity generated by rotation of rotor 140 and magnets 260. It is also shown a bypass arrangement 230 that provides a bypass flow for fluid entering the device that is considered too high flow. Bypass arrangement 230 is a spring-loaded bypass arrangement.

It is understood that the movement of the components in turbine assembly is relative to other components, accordingly it is understood that moving component A to B is equivalent of moving all other components from B to A. In other words, in a two-component system, either component can be designed to move when the other is fixed as shown throughout the figures.

It is understood that the turbine assembly described herein may be functional in any orientation. For consistency, the figures have generally shown the turbine assemblies with the flow inlet at the top and radial outlets at the sides, with the axial plane aligning with the vertical plane of the figures (y-axis). In other words, the turbine assembly and apparatus described herein are multi-orientational.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus for use in a generator comprising:
   a. a turbine assembly comprising a rotor that is operable to rotate about an axis;
   b. a turbine assembly inlet channel;
   c. a turbine assembly bypass channel; and
   d. a pressure regulating member wherein fluid is operable to enter the turbine assembly from the inlet channel generally axially with regard to the axis of rotation of the rotor and to exit the turbine assembly generally radially with regard to the axis of rotation of the rotor; wherein the inlet channel is operable to be in fluid communication with the bypass channel through a bypass aperture, wherein the pressure regulating member is operable to be moved from a first position to a second position, wherein in the second position the pressure regulating member restricts fluid flow through the bypass aperture to a greater extent than in the first position,
and wherein fluid that enters the bypass channel is diverted from entering the turbine assembly through the inlet channel.

2. The apparatus according to claim 1, wherein in the second position the pressure regulating member extends over the bypass aperture to a greater extent than in the first position.

3. The apparatus according to claim 1, wherein the rotor comprises a fluid entrance aperture and wherein the pressure regulating member is operable to be moved from a first position to a second position, wherein in the second position the pressure regulating member restricts fluid flow through the entrance aperture to a greater extent than in the first position.

4. The apparatus according to claim 3, wherein in the second position the pressure regulating member extends over the fluid entrance aperture of the rotor to a greater extent than in the first position.

5. The apparatus according to claim 1, wherein the pressure regulating member is operable to move between the first and second positions in response to the pressure of the fluid entering the apparatus.

6. The apparatus according to claim 1, wherein the pressure regulating member is biased into the first position or second position.

7. The apparatus according to claim 1, wherein the pressure regulating member is biased by a spring.

8. The apparatus according to claim 1, wherein there is more than one bypass apertures.

9. The apparatus according to claim 1, wherein the apparatus further comprises an inlet channel and wherein the pressure regulating member forms an inner sleeve of the inlet channel.

10. A generator comprising an apparatus according to claim 1.

11. The generator according to any claim 10, wherein rotor further comprises magnets.

12. The generator according to claim 10, wherein the generator is an inlet generator.

* * * * *